3,655,781
CRYSTALLIZATION OF 2-NITRO-2-METHYL-1-PROPANOL
Wallace F. Runge and Robert E. Laine, Terre Haute, Ind., assignors to Commercial Solvents Corporation, New York, N.Y.
No Drawing. Filed July 22, 1969, Ser. No. 843,792
Int. Cl. C07c 79/18
U.S. Cl. 260—643 A          7 Claims

ABSTRACT OF THE DISCLOSURE

A process for the purification and crystallization of 2-nitro-2-methyl-1-propanol (NMP) by treating a solution thereof with dilute hydrogen peroxide to remove free formaldehyde, concentrating the solution to obtain a melt and slowly introducing the melt into a chilled non-solvent liquid and recovering the crystallized NMP thereby obtained.

BACKGROUND OF THE INVENTION

This invention relates to the crystallization of 2-nitro-2-methyl-1-propanol (NMP). In a particular aspect, this invention relates to a process for the purification and recovery of NMP in crystalline form.

NMP is prepared by the condensation of 2-nitropropane (2-NP) with formaldehyde in the presence of an alkaline catalyst and a solvent consisting of water and a lower aliphatic alcohol, followed by crystallization of the NMP so obtained, as disclosed by B. F. Vanderbilt et al., U.S. Pat. 2,135,444 which is incorporated herein by reference thereto. However, the high water solubility (350 g./100 ml. at 20° C.), the relatively low melting point (90° C.) and tendency for the melt to supercool readily have made this product difficult to recover economically from the aqueous solution. Therefore there has been a long-standing need for an improved method for recovering NMP from solution.

Another long-standing problem is the objectionable free formaldehyde in the crystallized product. According to the prior process, a molar excess of from 10–15% of formaldehyde is employed to ensure a maximum yield based on the 2-NP. However, some of this excess formaldehyde is present in the crystalline product as an undesirable residue, and no satisfactory method for removing it has been proposed. Recrystallization of the NMP, for example, is uneconomical and impractical because of the high water solubility.

SUMMARY OF THE INVENTION

It is an object of this invention to provide a process for the crystallization of NMP.

Another object of this invention is to provide a method for the purification and recovery of NMP in crystalline form.

Other objects of this invention will be apparent to those skilled in the art from the disclosure herein.

According to the present invention there is provided a method for the purification and recovery of NMP from a solution obtained by the condensation of 2-nitropropane and formaldehyde in the presence of an alkaline catalyst, and a solvent consisting of water and a lower aliphatic alcohol. According to the present invention, the NMP solution may when preferred, but not necessarily, be treated with hydrogen peroxide to destroy the excess formaldehyde. The solution is then concentrated by vacuum evaporation thereby forming a melt which is then slowly introduced into a non-solvent liquid, e.g. an aliphatic hydrocarbon or a chlorinated aliphatic hydrocarbon or mixtures thereof at generally ambient temperature or below whereupon NMP crystallizes in excellent yield and high purity.

It was particularly surprising that free-flowing crystals can be obtained in very high yield by introducing an NMP melt into a non-solvent liquid. Previously, free flowing crystals have been obtained only by crystallization from dilute aqueous or alcoholic solutions at very high losses of product.

DETAILED DISCUSSION

According to the present invention, the NMP solution is received from the condensation step and the alkaline catalyst is removed by any suitable method, many of which are known.

When it is known that residual formaldehyde will be objectionable, the hydrogen peroxide step is included in the process. The formaldehyde concentration of the NMP solution is determined by any suitable method, many of which are known, and from about 0.5–2.0 molar equivalent, preferably 0.7–1.0, of hydrogen peroxide is added. The solution is then heated with agitation to within about 60–70° C. for 2–5 hours, generally 2.5–3.5 hours, after which time the reaction is substantially complete. The pressure is then reduced, e.g. to within the range of about 50–100 mm., and the heating period is then continued under evaporating conditions, e.g. under distillation conditions, until the NMP mixture is substantially anhydrous, e.g. until the water content is within 0.1–5.0%. Preferably the water content is reduced to a concentration such that the NMP has a crystallization temperature within about 45–50° C. Generally the foregoing step is effected by conducting the distillation to a liquid temperature of about 60° C.

When preferred, the heating step with hydrogen peroxide can be conducted under evaporating conditions so that concentration by evaporation is proceeding simultaneously with the peroxide treatment step. In this embodiment, the peroxide-NMP mixture is held at a pressure to provide a liquid temperature of about 60–70° C. and after about 2 hours the pressure is reduced to 50–100 mm. During the first 1–2 hours of the heating step, the mixture can be held under total reflux, and then take-off of solvent can be commenced. Preferably some solvent is maintained in the mixture until the hydrogen peroxide-formaldehyde reaction is substantially complete.

When the evaporative concentration step is complete, the molten, substantially anhydrous NMP is slowly introduced with agitation into a non-solvent liquid, preferably an aliphatic hydrocarbon, maintained at a temperature of from about 5° C. to about 30° C., preferably about 10–20° C., whereupon the NMP crystallizes. It is then separated from the hydrocarbon by any suitable method, e.g. by centrifugation, filtration or decantation, all of which methods are known in the art. After separation, residual non-solvent liquid is separated by aeration, or evaporation under reduced pressure, or by any other suitable means, many of which are known. When residual non-solvent liquid has been separated, the crystalline NMP is ready for packaging and/or use.

The hydrogen peroxide suitable for the practice of this invention can be either the 3 or 6% by wt. or the more concentrated grades of commerce, several of which are available. Generally the material having a concentration in the range of 27.5–52% is preferred. Higher concentrations than 52% are available and are useful in the present process, but they present certain hazards, so for reasons of safety, the moderately dilute grade is preferred.

Non-solvent liquids suitable for the practice of this invention include aliphatic hydrocarbons and chlorinated hydrocarbons or mixtures thereof. The preferred hydrocarbons are alkanes of from about 5 to 20 carbon atoms and mixtures thereof, preferably those having from 6–8 carbon atoms and include the isomers of hexane, heptane and octane because of the ease of removal of residual traces from the crystals. Pentane isomers are rather volatile but are otherwise suitable. The $C_9$–$C_{20}$ hydrocarbons are also suitable but they are less volatile than the preferred ones and are therefore less readily removed from the NMP crystals. The volume of hydrocarbon can vary widely within the concepts of this invention. Generally a volume of from about 0.5–100 parts of non-solvent liquid per part of melt is used but from 0.5–2 parts will be found most convenient. A ratio within 0.7–1.5:1 will generally be most frequently employed.

Any of the commercially available chlorinated hydrocarbons are suitable for the practice of this invention, e.g. carbon tetrachloride, chloroform, and preferably methyl chloroform, 1,1-dichloroethane, or 1,2-dichloroethane.

EXAMPLE 1

A sample of NMP solution was analyzed and found to consist of NMP 38.4%; methanol 45.7%; and water 15.9%. It was adjudged that the free formaldehyde content was low and not objectionable. A 2-kg. quantity of this solution was concentrated at reduced pressure of 50 mm. to a pot temperature of 60° C. to give a crystallization temperature of 48–49° C. The liquid melt was then slowly added to 2500 ml. of heptane accompanied by vigorous agitation. A temperature of approximately 20° C. was maintained.

When the addition was complete, the solids were filtered and dried at 25° C. and 0.1 mm. pressure. The dried crystals weighed 740 g. for a recovery of 96.3% and analyzed as follows:

NMP: 101 percent by wt.
HCHO: 0.05 percent by wt.
Water: 0.2 percent by wt.
Melting point: 79.1° C.

EXAMPLE 2

A sample of NMP solution analyzed 0.33% in formaldehyde. To it was added 0.8 mole of hydrogen peroxide (3% solution) per mole HCHO and heated to 70° C. for several hours. The solution was analyzed hourly with the following results:

| Time: | Percent HCHO in soln. |
|---|---|
| 0 | 0.33 |
| 1 | 0.18 |
| 2 | 0.14 |
| 3 | 0.09 |

The treated solution is evaporated to a melt and is poured into hexane at 10° C. A good yield of NMP crystals low in formaldehyde is obtained.

EXAMPLE 3

A lot of NMP solution was determined to have a formaldehyde concentration of 0.551% by wt. It was treated with hydrogen peroxide by two slightly different procedures. In procedure I, 0.8 mole of peroxide was added per mole of formaldehyde and the solution was heated at 70° C. for 3 hours then crystallized from water. In II, the ratio of peroxide to formaldehyde was 0.5:1, the solution was heated at 70° C. for 3 hours, the pH was adjusted to 4.6 and the NMP was crystallized. The following results were obtained.

| Method | Percent HCHO in— | |
|---|---|---|
|  | Solution before crystallizing | Crystals before drying |
| 0* | 0.551 | 0.08 |
| I | 0.137 | 0.13 |
| II | 0.262 | 0.07 |

*No peroxide treatment.

The crystals obtained from II were dried under a vacuum of 100 mm. at 25° C. for 16 hours. They analyzed as follows:

Formaldehyde: 0.06 percent by wt.
Water: .32 percent by wt.
Melting point: 84° C.
pH: 4.0

The product was determined to be of improved quality compared with the control.

EXAMPLE 4

A sample of NMP solution obtained from the production unit was determined to contain 0.107% formaldehyde. One kilogram of this solution was treated with 20.3 g. of 3% hydrogen peroxide in a 1:1 mole ratio to the formaldehyde and the mixture was heated for 3 hours at 70° C. Then the mixture was distilled at 50 mm. pressure until the pot temperature reached 60° C. This mixture had a crystallization point of 49–50° C. and was then poured into 1500 ml. of heptane which had been cooled to about 10° C. Sufficient cooling was employed to maintain the temperature at below about 20° C. The resulting slurry was centrifuged to remove the heptane and the solids were dried overnight at room temperature under reduced pressure of 100 mm. Hg. The formaldehyde content was determined to be 0.0147% by wt.

EXAMPLE 5

The experiment of Example 4 is repeated except that an equivalent amount of 52% by wt. hydrogen peroxide is substituted for the 3% wt. material and a mixture of octane isomers is substituted for heptane. Crystalline NMP is obtained in good yield.

EXAMPLE 6

The experiment of Example 4 is repeated except that carbon tetrachloride is substituted for heptane. Crystalline NMP is obtained in good yield.

EXAMPLE 7

The experiment of Example 4 is repeated except that chloroform is substituted for heptane. Crystalline NMP is obtained in good yield.

EXAMPLE 8

The experiment of Example 4 is repeated except that methyl chloroform is substituted for heptane. Crystalline NMP is obtained in good yield.

EXAMPLE 9

The experiment of Example 4 is repeated except that 1,1-dichloroethane is substituted for heptane. Crystalline NMP is obtained in good yield.

EXAMPLE 10

The experiment of Example 4 is repeated except that 1,2-dichloroethane is substituted for heptane. Crystalline NMP is obtained in good yield.

What is claimed is:
1. A process for the purification and recovery of nitro-2-methyl-1-propanol from a solution containing it in the presence of formaldehyde comprising the steps of:
(a) concentrating by evaporation at reduced pressure and elevated temperature until the water content is within the range of about 0.1–5.0% by wt., thereby producing a melt, (b) introducing said melt slowly and with vigorous agitation into from 0.5–100 volumes of a non-solvent liquid selected from the group consisting of alkanes having from 5 to 20 carbon atoms, carbon tetrachloride, methyl chloroform, 1,1-dichloroethane and 1,2-dichloroethane and mixtures thereof at a temperature less than 20° C. thereby crystallizing said nitro-2-methyl-1-propanol, and (c) separating said non-solvent liquid from said nitro-2-methyl-1-propanol.

2. The process of claim 1 wherein said nitro-2-methyl-1-propanol solution is treated with hydrogen peroxide in a ratio of 0.5–2.0 per mole of said formaldehyde for about 1–3 hours at a temperature of from 60–70° C.

3. The process of claim 1 wherein the evaporation is effected at a pressure of within about 50–100 mm. until the liquid temperature is about 60° C.

4. The process of claim 1 wherein said alkane is heptane.

5. The process of claim 2 wherein the said heating step with hydrogen peroxide is effected during the step of vacuum distillation.

6. The process of claim 1 wherein the volume of non-solvent liquid is in a ratio of 0.5–2.0:1 of said melt.

7. The process of claim 1 wherein the volume of non-solvent liquid is in a ratio of 0.75–1.5:1 of said melt.

References Cited

UNITED STATES PATENTS

| | | | |
|---|---|---|---|
| 2,394,048 | 9/1945 | Smith et al. | 260—632 N |
| 3,535,386 | 10/1970 | Dillard | 260—617 E |
| 2,475,996 | 7/1949 | Smith | 260—638 N |
| 2,229,532 | 1/1941 | Vanderbilt | 260—632 N |
| 2,135,444 | 11/1938 | Vanderbilt | 260—632 N |
| 3,037,061 | 5/1962 | Bachman et al. | 260—638 N |

OTHER REFERENCES

Vanderbilt et al., "I & EC," vol. 32 (1940), pp. 34 to 38.

LEON ZITVER, Primary Examiner

J. E. EVANS, Assistant Examiner

UNITED STATES PATENT OFFICE
CERTIFICATE OF CORRECTION

Patent No. 3,655,781          Dated April 11, 1972

Inventor(s) Wallace F. Runge and Robert E. Laine

It is certified that error appears in the above-identified patent and that said Letters Patent are hereby corrected as shown below:

Column 4, line 8 - "0.13" should be --0.03--

Signed and sealed this 25th day of July 1972.

(SEAL)
Attest:

EDWARD M. FLETCHER, JR.      ROBERT GOTTSCHALK
Attesting Officer             Commissioner of Patents